July 28, 1970        R. A. GRAHAM        3,521,863
CENTRIFUGAL MIXER HAVING VACUUM MEANS
Filed Feb. 1, 1968        2 Sheets-Sheet 1

INVENTOR.
ROBERT A. GRAHAM
BY
McNENNY, FARRINGTON,
PEARNE, & GORDON
ATTORNEYS

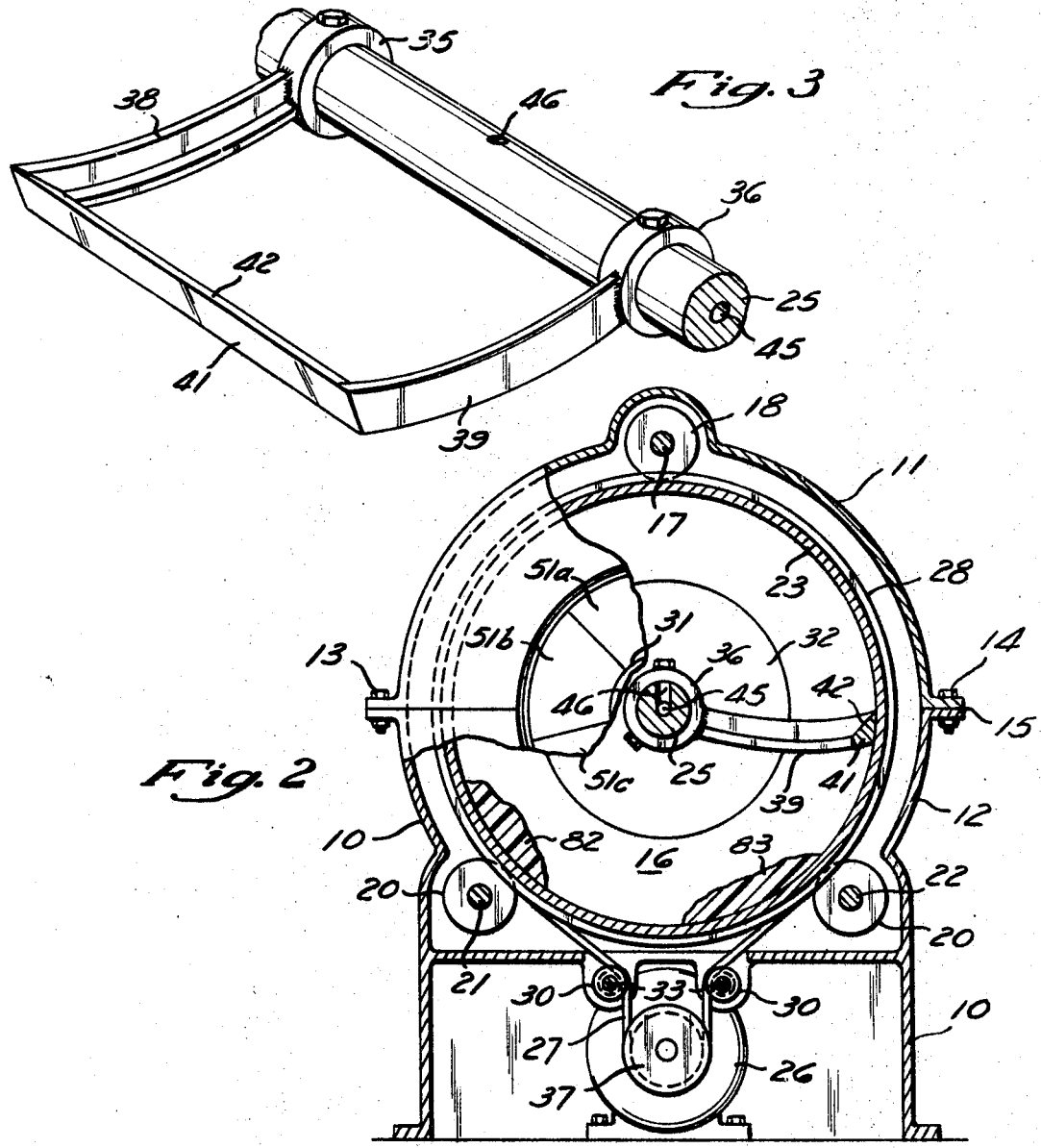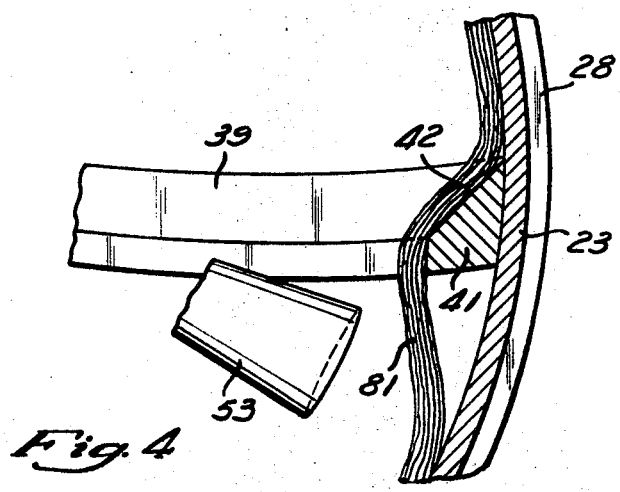

United States Patent Office 3,521,863
Patented July 28, 1970

3,521,863
CENTRIFUGAL MIXER HAVING VACUUM MEANS
Robert A. Graham, 2154 Dover Road,
Westlake, Ohio 44145
Filed Feb. 1, 1968, Ser. No. 702,343
Int. Cl. B04b *11/00*
U.S. Cl. 259—3        7 Claims

ABSTRACT OF THE DISCLOSURE

Disclosed is a centrifugal mixer and a method of mixing finely divided resins with a plasticizer to obtain plastisols of aliphatic vinyl and vinylidene compounds. Resin and other solid additives are added to a chamber which is rotated to place the resin under centrifugal force and to cause the resin to pass over a mixing bar and be deflected out of the centrifugal force field. The liquid additives and the plasticizer are added after a vacuum between 22 and 28 inches of mercury is obtained in the chamber. After the plasticizer and additional liquid additives are added to the resin in the chamber, mixing is continued until the stress point of the mixture is passed and the plastisol or paste is obtained. The chamber includes a drum driven about a fixed shaft and pressure plates mounted on the shaft to provide the closed chamber. The pressure plates pneumatically seal the chamber and rotate with the drum during mixing of the vacuum. The resin entry pressure plate is provided with a peripheral door to permit additions and removal while the drum rotates. The liquid additive line is provided with a check valve to maintain the vacuum during mixing. Paste is removed by suction below the mixing bar.

BACKGROUND AND PRIOR ART

At the present time the mixing of paste or plastisols of aliphatic vinyl and vinylidene compounds and particularly polyvinyl chloride plastisols is commercially done in a bowl mixer using an agitator generally driven in a planetary action, or in a bowl mixer having the propeller-like impeller units which operate on the principle of vortical mixing.

For a general background which may be of aid to some, the reader is referred to Polymer Processes, G. E. Schildknecht, Interscience Publishers, 1956, especially chapter 14—"Paste Techniques" and to Plastics Engineering Handbook, Reinhold Publishing Corp., 3rd ed. 1962, chapter 16—"Vinyl Dispersions."

The equipment available at the present time is expensive and does not achieve the advantages that I have found available in accordance with my invention.

Centrifugal mixers of the type disclosed herein are known. Reference may be had to the apparatus shown in the U.S. Letters Patent 2,745,748 to James F. Mc-Cashen. Machines of the type therein disclosed have been used in the making of bread dough in accordance with the disclosure of U.S. Pat. 2,996,022 to James F. McCashen.

My invention relates to an improved machine of the type described in the two mentioned patents and to a novel and improved method of mixing plastisols of the aforementioned type, especially those polyvinyl chloride plastisols which are free of entrained gases normally trapped in the plastisols during preparation and which must otherwise be removed in a separate machine and by a separate operation. These plastisols are utilized in casting and coating applications where the presence of entrained air or other gases is undesirable.

For commercial reasons, particularly because production scredules in many industries necessitate intermingling of various items and frequent changes in molds, the trade has generally, except in special applications, abandoned automatic or semi-automatic machines that have appeared. However, the batch type equipment presently available is still quite expensive, relatively slow in operation, and does not yield the quality product which may be obtained by using my method and apparatus.

In addition, many prior art devices have generated heat to such an extent that the plastisols or paste gels (in the sense of incompletely hardened, as opposed to "fuse").

I have provided a novel centrifugal mixer which is economical to manufacture and avoids the problems encountered in known plastisol mixers.

In addition, the methods available to the operator of the mixer which I have provided result in approved paste in a much shorter period of time than prior machines.

SUMMARY OF INVENTION

In accordance with my invention, I have provided a novel and improved method of making plastisols or "paste." The solid resin is placed in a rotating drum or chamber under vacuum. The rotation of the drum carries the resin about the axis of the drum under centrifugal force. A deflector bar placed and securely held in the path of the rotating resin forces the resin out of the rotary path and out of the centrifugal force field causing free fall of the resin back to the surface of the rotating drum. The plasticizer is added. The finely divided resin and liquid rotate about the same axis. Agglomerate masses of solid and liquid are caused to accumulate rotating about the axis of the drum and across the deflector bar, a stress point is obtained at which suddenly there is formed a continuous ribbon of homogenous paste in which the resin has adsorbed and absorbed the plasticizer. The paste is rotated for a short additional time and if necessary may be let down at this or a later time by the addition of additional plasticizer. Pigment may be added in dry form without employing a wetting agent. Also, the pigment may be added with a wetting agent employed to wet the pigment. Preferably, the above mixing will be done under a vacuum between 22 and 28 inches of mercury in order to obtain a deaerated paste. This vacuum is maintained throughout the addition of the plasticizer.

The apparatus according to this invention, the details of which will be discussed below, is such that the vacuum may be maintained before and after liquids are introduced into the machine.

Further objects and advantages will appear from the following description with reference to the drawings wherein:

FIG. 2 is an elevational view of the centrifugal mixer of FIG. 1, partially intersectioned.

FIG. 3 is an enlarged perspective view showing the mixer bar.

FIG. 4 is a view of the machine at the point where the paste passes over the mixer bar.

Figure 1:
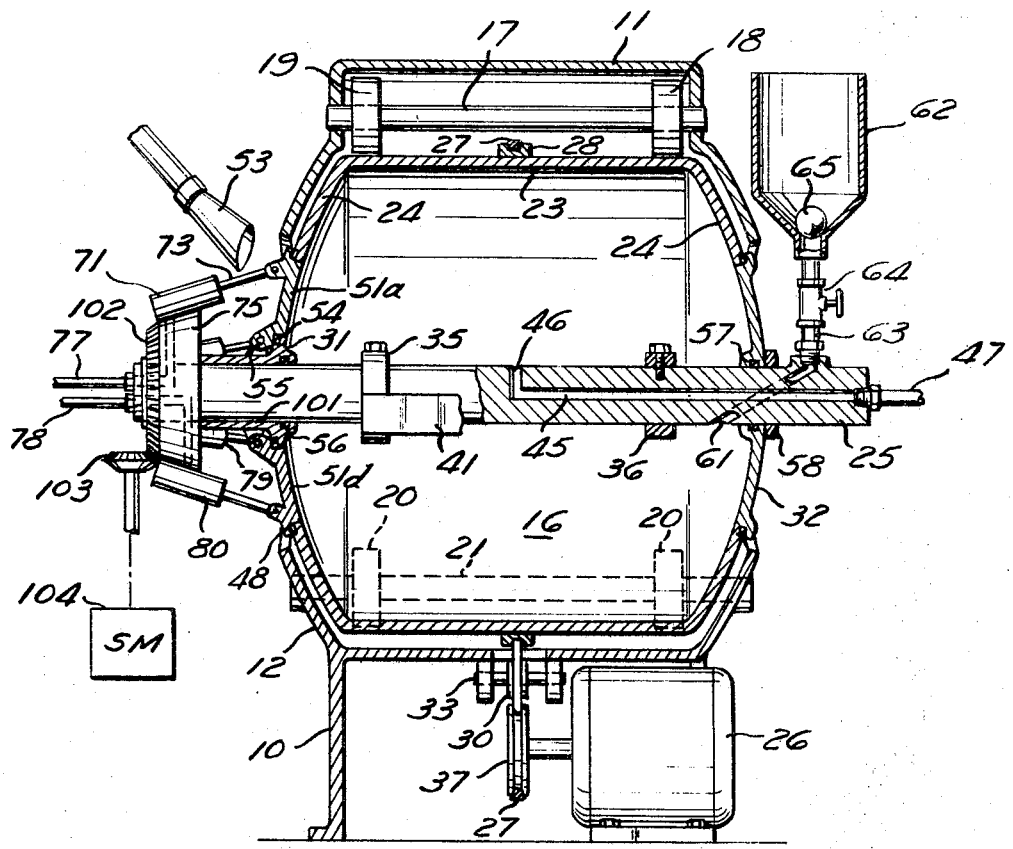
FIG. 1 is a fragmentary elevation, partially in section, of a centrifugal mixer in accordance with the preferred embodiment of my invention.

Referring now to the drawings in greater detail, in FIGS. 1 and 2 it will be seen that the centrifugal mixer is provided with a frame 10 having upper 11 and lower 12 sections locked together by 13 and 14 along a parting line 15 so that the upper section may be removed from the lower section.

A pressure chamber indicated generally at 16 is provided. The pressure chamber is intended to rotate within the frame. In the upper housing 11 an idler support shaft 17 is journaled. A pair of idler rollers 18 and 19 are mounted on the idler support shaft and contact the pressure chamber 16. In the lower housing 12 a total of four trunnion support rollers 20 are provided and mounted on a pair of support shafts 21 and 22 journaled in the lower housing section 12.

The pressure chamber 16 includes a large drum 23 having an outer cylindrical wall and side walls 24 extending radially inwardly of the drum and having a concave inner surface. The drum is mounted on the trunnion support rollers for rotation about its axis. An axial stationary shaft 25 passes through the axis of drum 23. The shaft 25 is preferably mounted on separate supports (not shown).

The drum is rotated about its axis by a drive including an electrical motor 26, a driving V-belt 27 wound on drum pulleys 28 and 37. Tension on the belts is provided by adjustment of a pair of sheaves 30 which are mounted on frame 10 by an eccentric pin 33. The motor causes the belt to rotate and to drive the entire pressure chamber 16 in a clockwise direction about the stationary shaft 25.

In addition to the drum 23 the pressure chamber includes a pair of front and back pressure plates, 31 and 32 respectively, mounted on the stationary shaft 25 for the drum 23.

The pressure plates 31 and 32 have a concave inner surface and contact the drum at its side walls 24 such that when the pressure plates are in place the same arc as that of the inner surface of pressure plates and the inner surface of the side walls form a dish shaped side for the pressure chamber which will resist compression by a greater air pressure outside of the pressure chamber than within. Preferably, as shown in FIG. 1, the forward entry pressure plate 31 is provided with a peripheral door 51 which comprises a plurality of overlapping door elements (identified in the drawings by numerals 51a, 51b, 51c, 51d) having the same interior contour as the pressure plate and being pivotally mounted on the pressure plate 31 near shaft 25. The structure is described in greater detail below.

Within the pressure chamber a pair of axially spaced collars 35 and 36 are bolted to the shaft 25. Welded to the collar is a pair of truss supports 38 and 39 extending to the inner cylindrical wall of the drum 23. At the inner wall of the cylindrical drum a deflector bar 41 is mounted on the two truss arms 38 and 39. The deflector bar 41 has a planar deflecting surface 42 extending at 45° to the radius of the drum. This deflector bar or mixer bar 42 is intended to guide material being mixed from the cylindrical wall of the drum.

To provide the vacuum line the axial support shaft 25 has an elongated bore 45 extending therethrough to the middle of the pressure chamber where the bore opens through an aperture 46 into the chamber. The vacuum line is connected to a vacuum pump (not shown) by the flexible line 47. Upon a drawing of vacuum in the chamber, the vacuum aids in sealing the dish-shaped pressure plates against the drum, because the plates, including the door portion 51 of entry plate 31, are adapted to rotate with the drum of the stationary shaft 25.

Figure 5:
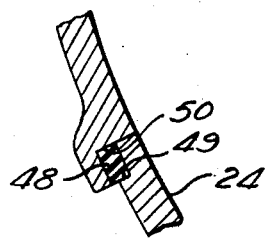
FIG. 5 is a section of the seal joint of a drum of FIG. 2 and the pressure plate thereof.

This seal is enhanced by O-ring seals 56 and 57 for the pressure plates at the stationary shaft and the provision of an elastomeric gasket 48 bonded to each pressure plate and each door in a plate channel 50 in each plate which is adapted to provide sealing engagement with the adjacent portion of drum 23, as shown in FIGS. 1 and 5. A corresponding channel 49 is provided in the side walls 24 of the drum. Each door element is provided with a sealing gasket 54 so that a vacuum may be maintained in the drum whenever the door elements are closed.

The peripheral door 51 may be opened to permit entry into the drum of a paste removal device, preferably a vacuum nozzle 53. Each door element has a pivot hinge bracket 55 welded to the entry plate 31. The back pressure plate is provided with a positive positioning nut 58. A similar positioning nut arrangement may be employed for the front plate.

The slant bore dispensing passage 61 is provided in shaft 25 at the back pressure plate which slopes into the pressure chamber 16 from outside of the chamber. Through the slant bore dispensing passage plasticizers and liquid material may be dispensed into the pressure chamber.

A fluid dispenser 62 is connected to the dispensing passage 61 by means of feeder line 63 part of the dispensing passage screwed into the stationary shaft 25. A vacuum check comprising a shut-off valve 64 placed in the feeder line 63 and a ball float check valve 65 is provided for the fluid dispenser 62 so that when the shut-off valve is open and fluid in the dispenser has reached the bottom level it may shut off feeder line 63 so that a vacuum may be maintained in the pressure chamber.

A hopper (not shown) may be provided on the upper housing with a chute extending adjacent to the drum so that solid resin may slide onto the door 51 when it is open to direct solid resin into the chamber. A plurality of activators preferably pneumatic cylinders are connected to the door by piston rods for opening and closing the peripheral door 51 so that the peripheral door can be caused to pivot open as described below. These pneumatic cylinders are mounted on and connected to a collar gland 75 rotatable on the shaft 25 and which is in turn connected to pressure lines 77 and 78 through which pneumatic pressure or the lack thereof is supplied for actuation of the piston. When the piston rod 73 of pneumatic cylinder 71 is moved by supplying pressure, the door element 51a opens.

As previously stated the door elements are overlapping. When door elements 51a and 51c opens by actuation of cylinders 71 and 79 respectively by pressure supplied through connecting bores in collar gland 75 connected to pressure line 77, the peripheral door is partly open. To complete the opening of the door a second group of door elements (underlying the first group including elements 51a and 51c) 51b and 51d are caused to open by supplying pressure to a second set of alternate cylinders, including cylinders 80, from supply line 78. The second set of actuators have a slightly shorter stroke than the first set.

In order that the peripheral door 51, the gland 75, and the pressure plate 31, may be synchronously rotatable, the pressure plate 31 is attached to gland 75 by a collar connection 101 on stationary shaft 25. The collar 101 is adapted to rotate on the shaft and provide a driving connection between the plate 31 and the gland 75. The gland 75 is connected to bevel gear 102 which engages a driving bevel gear 103. The bevel gear arrangement is driven by a synchronous motor 104. This synchronous motor is driven synchronously with motor 26 so that the gland and front plate 31 may be rotated synchronously with the drum 23.

Accordingly the door may be opened at any point in the cycle to permit ready access into the drum so that resin may be passed into the chamber or so that the paste may be removed through the peripheral door while the drum revolves. This paste removal is accomplished by the suction nozzle 53 connected to a suitable line either to a reservoir or to a mold so that the finished plastisol can be taken out of the drum and used. The nozzle is constructed so that it may be placed to suck resin from a point where no centrifugal force is placed upon the plastisol that is, at the point 81, shown in FIG. 4, where the mixture has just left the deflector 41.

It is to be understood that the illustrated apparatus has been shown for the purpose of providing a preferred apparatus by which the present method may be carried out, and that either variations in the preferred apparatus or of its parts may be employed in using the method of mixing of resins and plasticizers hereinafter described.

The operation of the apparatus will be readily understood from the following brief description. The drum 23 is rotated on the housing and a measured amount of finely divided resin is placed in the drum. The drum door is closed and the pressure chamber 16 is caused to rotate at such a speed that the centrifugal force which is applied to the material within the drum is such that it is sufficient to cause it to form a layer on the cylindrical surface of drum 23. Line 45 is connected to a vacuum and a vacuum between 22 and 28 inches of mercury is drawn. The drum continues to rotate while the vacuum is drawn. When the vacuum within the pressure chamber reaches a predetermined amount, a valve 64 is opened and a measured amount of liquid passes from the dispenser 62 through the dispensing passage 61 into the pressure chamber. The rotation of the drum causes the powder layer in which the liquid plasticizer is included to form on the drum surface. Rotation of the drum is continued and the layer is caused to engage deflector bar 41. The surface 42 of the deflector bar deflects the material inwardly away from the cylindrical surface of the drum 23. The operation is applied repeatedly and the layer of resin and plasticizer begins to approach a stress point and a deflection surface 42 causes the layer to form into agglomerate masses 82 and 83 of resin and plasticizer or globs thereof which are caused to continue to rotate in the field of centrifugal force. The continuation of the operation proceeds and the subsequent deflection of the agglomerate masses 81 and 82 out of the centrifugal force field and the return thereto quickly causes the stress point to be reached and the agglomerate masses break into a smooth ribbon 81 of mixed paste in which the resin has absorbed and adsorbed the plasticizer to form a plastisol. From the initial point of change this takes about 1.25 minutes. The rotation is continued for several cycles. The drum continues to revolve and the vacuum is released and the drum peripheral door is opened. A suction nozzle is inserted just below the mixer bar as shown in FIG. 4 where the paste is away from the cylinder wall and the paste withdrawn to a reservoir or mold or other application where it is to be used.

The mixing time is two minutes from the beginning of the cycle, charging the machine with resin, to the discharge point when a vacuum is not employed. Depending upon the speed in which a vacuum is drawn the cycle time is slightly increased with a vacuum. No substantial or measurable temperature change will be noticed. In a typical mix, a 100/50 mix, the following materials were used. "Geon 128" (lot 96154-9 of the B. F. Goodrich Chemical Company) and "Goodrite" plasticizer 264 (DOP), also manufactured and sold by B. F. Goodrich Chemical Company, was mixed. It will be understood that a 100/50 mix comprises two parts by weight of resin and one part by weight of plasticizer. A satisfactorily deaerated plug, after fusing, can be obtained. The plastisol itself after aging one day was measured with the following viscosity results.

Brookfield (RVF) viscosity in centipoises (PSTP No. 2):
    2 r.p.m. ------------------------------ 34,000
    20 r.p.m. ------------------------------ 17,250
Yield units ---------------------------------- 280

The North Fineness (PSTP No. 13) was "6 many."

Although a 100/50 mix has been described, a 100/40 mix may be easily made in accordance with the method described.

It will be understood, the resin may be colored by adding pigments to the mixer with the charge of resin, or after the plastisol is obtained depending upon the result desired of the final product. Likewise, other solid and liquid additives may be added to the mix. Preferably, all solid additives are included in the initial charge. Liquid additives may be added at any point in the cycle, and this method may be employed to let down premixed plastisols.

While the apparatus described has been developed for use as a method of mixing vinyls, both the method and apparatus may be employed in mixing and/or compounding other resins using a solid resin and a liquid ingredient. For instance, ethyl cellulose may be compounded with a plasticizer or solvent. Other cellulose compounds, such as carboxymethylcellulose may be formed in the apparatus described, by the mixing of liquid chloroacetic acid with powdered alkali cellulose.

While the illustrated embodiment of the invention has been described in considerable detail, it will be understood that many rearrangements and modifications may be resorted to in both the method and the apparatus without departing from the scope of the invention as described in the following claims.

What is claimed is:

1. A centrifugal mixer comprising a frame, a drum mounted on said frame for rotation about its axis, a drive for said drum adapted to cause said drum to rotate about its axis, means for closing said drum to provide a closed chamber, a means for drawing a continuous vacuum in said chamber while permitting said drum to be rotated about its axis, a deflector mounted within said chamber in contact with a wall of said drum, dispensing means adapted to pass material into said drum when said vacuum is drawn, said dispensing means including a liquid dispenser and a dispensing passage connecting to said liquid dispenser and a check valve for said dispensing passage adapted to maintain a vacuum within said chamber before and after said material is passed into said chamber.

2. A mixer according to claim 1 wherein a shaft passes through the axis of said drum and said deflector includes a bar mounted on said shaft.

3. A mixer according to claim 2 wherein a pair of closure plates are mounted on said shaft for rotation about said shaft, said closure plates being adapted to engage said drum and to rotate with said drum.

4. A mixer according to claim 3 wherein one of said plates is provided with a peripheral door, and wherein said shaft carries an actuator for opening and closing said door.

5. A mixer according to claim 4 wherein said peripheral door comprises a plurality of overlapping door elements.

6. A mixer according to claim 4 wherein said actuator is adapted for rotation about said shaft, synchronous drive means are provided to cause rotation of said actuator about said shaft, and said synchronous drive means are driven synchronously with said drive for said drum so that said actuator may rotate with the same speed as said drum.

7. A centrifugal mixer comprising a frame, a drum mounted on said frame for rotation about its axis, drive means for said drum adapted to cause said drum to rotate about its axis at a speed such that centrifugal force causes a charge of material in said drum to be rotated in a circular path about said axis, means for closing said drum to provide a closed chamber, means for drawing a continuous vacuum in said chamber while permitting said drum to be rotated about said axis, and a deflector mounted within said chamber in contact with said drum, said deflector having a deflecting surface adapted to cause said charge to pass from said field of centrifugal force inwardly away from said circular path and downwardly in the direction of rotation of said drum, a pair of closure plates for said drum, said closure plates being adapted to engage said drum and to rotate with said drum when said vacuum is drawn, one of said closure plates being mounted on said drum so that it may be axially removed.

References Cited
UNITED STATES PATENTS

| | | | |
|---|---|---|---|
| 918,749 | 4/1909 | Hommel | 259—34 X |
| 2,838,290 | 6/1958 | Simpson | 259—88 X |
| 2,996,022 | 8/1961 | McCashen | 259—3 X |
| 3,344,447 | 10/1967 | Candor et al. | 68—17 X |
| 3,401,834 | 9/1968 | Siegla | 68—17 X |
| 2,868,144 | 1/1959 | Ambrette | 107—31 |

WILLIAM I. PRICE, Primary Examiner

U.S. Cl. X.R.

259—15